United States Patent [19]
Nehr et al.

[11] 3,853,208
[45] Dec. 10, 1974

[54] VEHICLE WHEEL BRAKE

[75] Inventors: Charles W. Nehr, Bloomfield Hills; George A. Davis, Madison Heights, both of Mich.

[73] Assignee: Rockwell International Corporation, Pittsburgh, Pa.

[22] Filed: June 1, 1973

[21] Appl. No.: 366,305

[52] U.S. Cl................................. 188/335, 188/216
[51] Int. Cl............................................. F16d 65/08
[58] Field of Search............ 188/78, 325, 331, 335, 188/340, 206 R, 216

[56] References Cited
UNITED STATES PATENTS

| | | | |
|---|---|---|---|
| 2,082,244 | 6/1937 | Dick | 188/340 |
| 2,389,405 | 11/1945 | Birchfield | 188/335 X |
| 3,497,040 | 2/1970 | Powers | 188/216 |
| 3,666,061 | 5/1972 | Nehr | 188/335 X |

Primary Examiner—Duane A. Reger

[57] ABSTRACT

A brake assembly adapted to be mounted on a motor vehicle axle and designed to permit removal of the assembly brake shoes for relining without removal of the brake drum or other structure located outboard of the assembly. The assembly includes a main support member adapted to be secured to and surround the axle and that carries brake shoe actuating means. The brake shoes, spaced radially outwardly from the support member, are received in a channel defined by brake shoe guide means removably secured to the outer periphery of the support member by fasteners readily accessible from the inboard side of the brake assembly. Return spring means interconnect the brake shoe and the guide means so that the brake shoes can be removed from the assembly by removal of the guide means from the support member.

5 Claims, 3 Drawing Figures

VEHICLE WHEEL BRAKE

BACKGROUND OF THE INVENTION

In order to remove the brake shoes for relining in certain conventional motor vehicle brake assemblies, it is necessary to disassemble large portions of the vehicle axles mounting such brake assemblies in order to gain access to and permit removal of the brake shoes. An example of such an assembly is one mounted on a vehicle drive axle of the planetary type. This type of drive axle has a planetary gear set, as well as a conventional brake drum, wheel and rim, mounted outboard of each of the brake assemblies carried by the axle. In many heavy equipment applications, these gear sets are extremely large in size and weight and can be removed from the axle only by use of special equipment such as a hoist or crane. Large labor efforts also must be expended to accomplish removal of such gear sets.

The relining of brake shoes is part of the regular maintenance program that must be accomplished periodically on a vehicle brake assembly in order to insure satisfactory brake performance and vehicle operation. It thus readily can be understood that if brake shoe relining must be preceded by the removal of planetary gear sets as well as brake drums, wheels and rims the accomplishment of this ordinary maintenance operation will result in lengthy vehicle down time due to the necessary use of special equipment and the performance of time consuming manual tasks. Also, substantial efforts and time must be expended even if no planetary gear set is involved, as all structure carried by the axle outboard of conventional brake assemblies must be removed from the axle and reassembled attendant a brake relining job.

It thus is desirable to provide a motor vehicle brake assembly that allows the removal of the assembly brake shoes for relining or inspection from inboard of the brakes, thus obviating the necessity of removing the brake drum or other structure located outboard of the assembly. Designing such a brake assembly is complicated by the fact that ease of removal of brake shoes is impeded by the presence of brake shoe guides that are utilized conventionally to prevent unwanted lateral brake shoe movement. Such brake shoe guides are disclosed by U.S. Pat. No. 2,090,303, issued Aug. 24, 1937. Even in prior art brake assembly designs wherein the brake shoe guides are removable from the assembly, as is taught by U.S. Pat. No. 2,867,297, issued Jan. 6, 1959, ease of brake shoe removal is hindered by difficulty in obtaining sufficient access to the means holding the shoe guides in position. Additionally, in the prior art as typified by the United States patents cited above, and also in brake designs especially developed for ease of shoe removal such as shown in U.S. Pat. No. 3,666,061, issued May 30, 1972, it is necessary, prior to removal of the shoe, to disengage the brake return spring or springs that attach the shoe to the mounting plate or spider or another shoe. Because of limited access and the relatively large spring rates used for brake shoe return springs, disengagement of this spring is a difficult task requiring manual strength on the part of the mechanic and often special tools.

It is, therefore, an object of this invention to provide a motor vehicle brake assembly having a design permitting easy removal of the brake shoes from inboard of the assembly. This invention further provides for such removal of the brake shoes unimpeded by brake shoe guides that positively prevent unwanted lateral movement of the shoes. Further, this invention allows brake shoe removal from the brake assembly location without disengaging the brake shoe return springs, thus greatly simplifying this operation. Also, this design accomplishes these various objects while utilizing brake shoes of conventional, economical design and permits ease of manufacture and fitting of the entire brake assembly.

SUMMARY OF THE INVENTION

A vehicle brake assembly constructed in accordance with this invention is adapted to be mounted on a vehicle axle. The brake assembly includes a main support member adapted to be secured to the axle about the periphery thereof and extending generally radially therefrom. Brake shoe actuating means are carried by the support member. At least one brake shoe guide element is positioned on the outer periphery of the support member and removably secured thereto by fastening means. These fastening means readily are accessible from the inboard side of the brake assembly. The guide element defines a radially extending, outwardly open channel. A vehicle brake shoe having brake lining formed on the outer extremity thereof includes a radially extending web portion that is received in the guide element channel to prevent lateral movement of the brake shoe. Spring means interconnect the brake shoe and the guide element while permitting radial outward movement of the brake shoe in response to forces exerted on the shoe by the actuator means. This arrangement allows removal of the brake shoe from the brake assembly simply by manipulation of the fastening means to remove the guide element from the support member.

DESCRIPTION OF THE INVENTION

Figure 1:
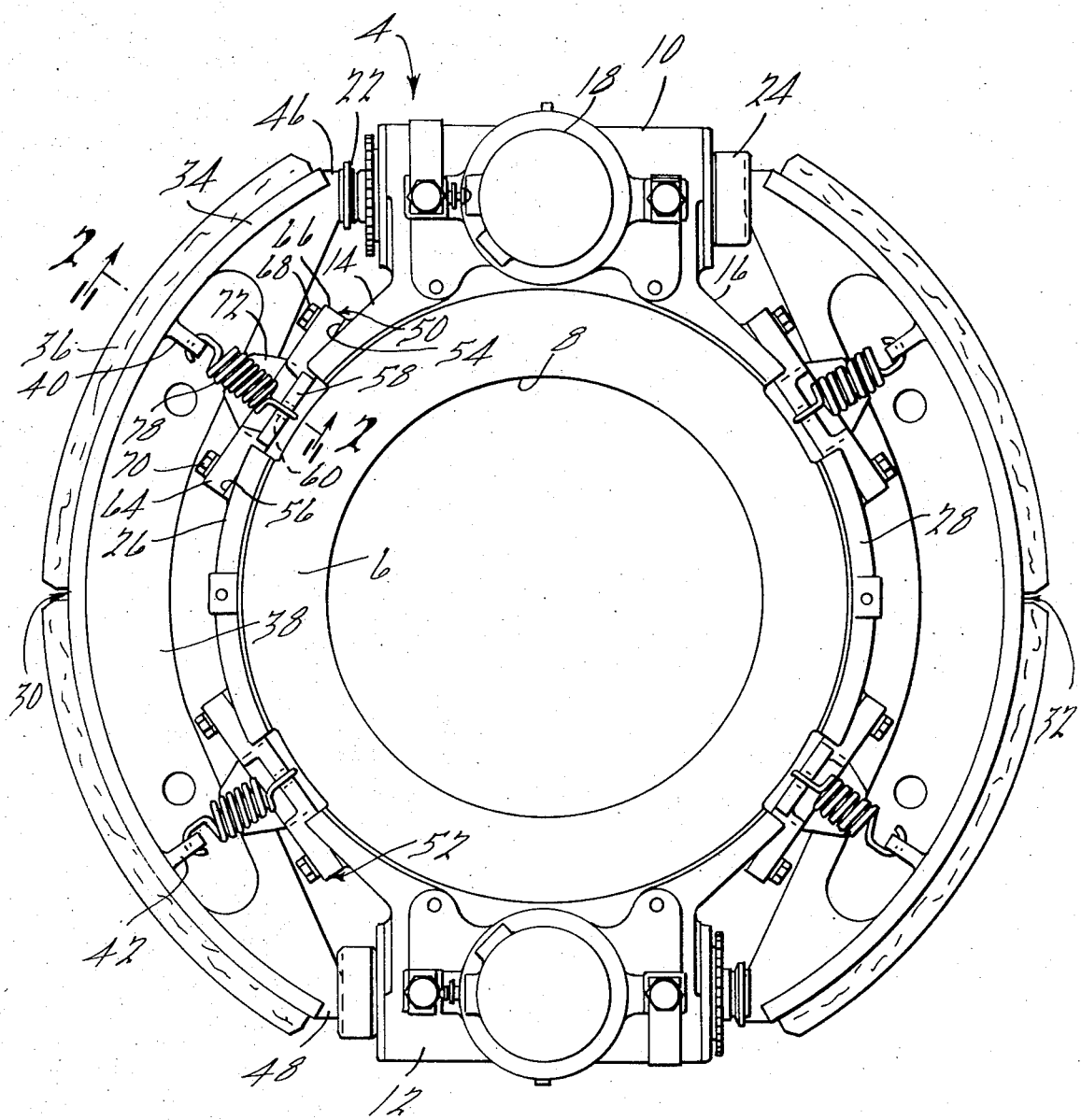
FIG. 1 is an elevation view of the brake assembly of this invention taken from a point inboard of the brake assembly.
Figure 3:
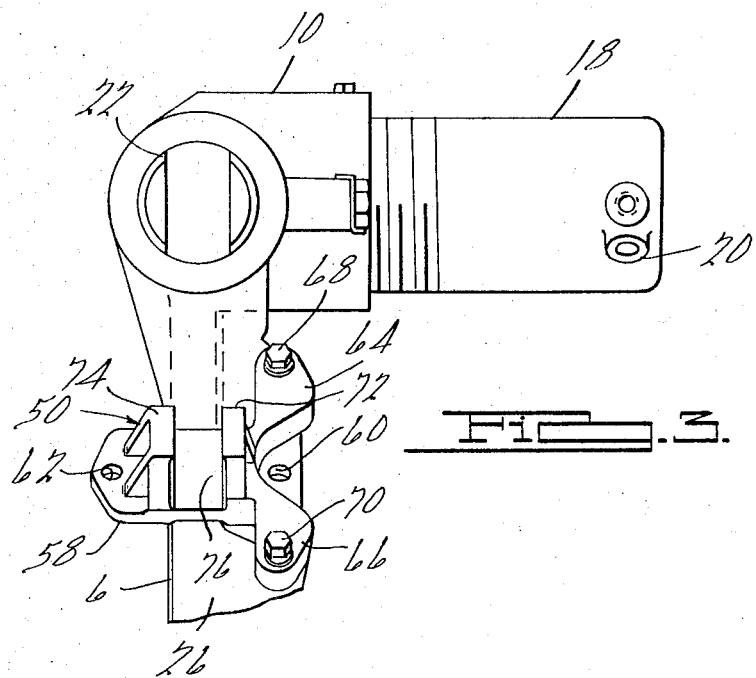
FIG. 3 is a partial side view, with the brake shoes removed, of the area of the brake assembly of FIG. 1 whereat the guide element of FIG. 2 is located.

Referring now in detail to the drawings, the numeral 4 denotes generally the brake assembly of this invention. This assembly includes a mounting plate or spider 6 having a central aperture 8 formed therethrough. Aperture 8 permits the mounting plate 6 to be positioned about a vehicle axle. Mounting plate 6 may have holes formed therethrough about the periphery of aperture 8 to facilitate the fastening of the mounting plate to a radially extending flange formed on the vehicle axle.

The mounting plate 6 is an integral one-piece casting and includes brake actuator housing portions 10 and 12 identically formed on opposite sides of the mounting plate. Due to the identity of these housings, only one of them will be described in detail. Between the housing 10 and the main body of mounting plate 6 are located integrally cast transition ribs 14 and 16 that also serve to strengthen the body of the mounting plate 6. Threadably secured into housing 10 is a fluid motor 18 having a fitting 20 for the attachment of a fluid pressure line thereto. The fluid motor 18 cooperates with wedge-type brake actuating means located within the housing 10 and similar in design to those shown in U.S. Pat. No. 3,227,247, issued Jan. 4, 1966. Such brake actuating means form no part of this invention. (Although for purposes of illustration, a wedge-type brake actuation system is included in this disclosure, it is important to note that the vehicle brake assembly of this invention can be used with any type of expansion brake actuator as for example a cam type actuator). An adjusting bolt 22 and a brake actuating plunger 24 are located on opposite ends of the housing 10. As is well known in the art, this plunger is capable of movement out of the housing 10 to cause braking action as will be discussed below, while the bolt 22 may be varied in position to adjust the "at rest" position of the brake shoe.

Also integrally formed about the periphery of mounting plate 6 are a pair of raised ribs 26 and 28. These ribs are formed to provide additional strength to the casting comprising the mounting plate 6.

Figure 2:
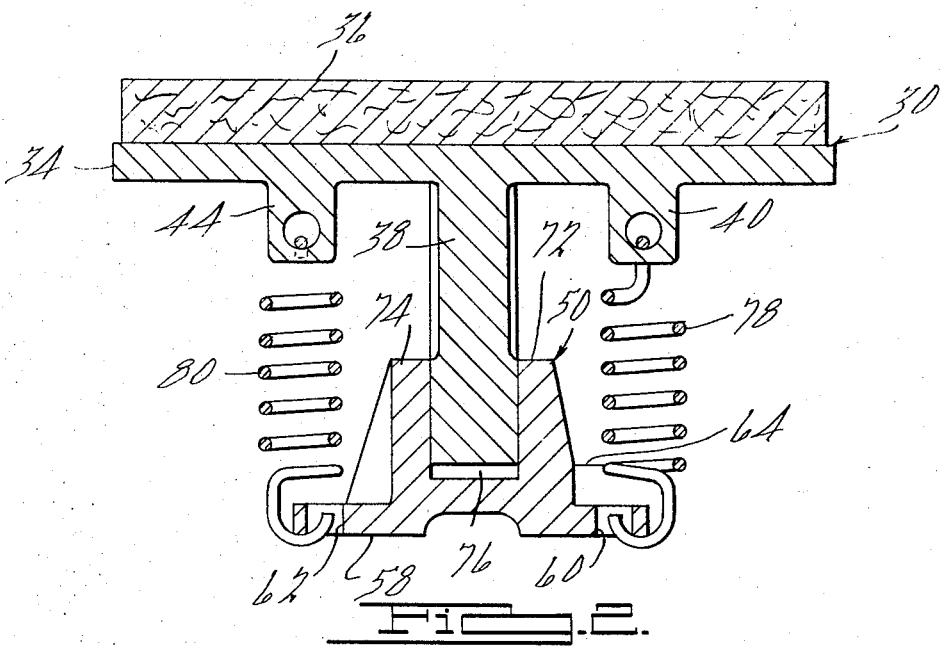
FIG. 2 is a partial sectional view taken along the line 2—2 of FIG. 1 and showing a brake shoe guide element and associated brake shoe.

The brake assembly 4 includes a pair of conventional brake shoes 30 and 32 of identical construction so that only shoe 30 will be described in detail herein. The shoe 30 includes a table portion 34 made from a flat element deformed into a curved configuration. Positioned on the outer surface of table 34 is conventional brake lining 36 that may be bonded to table 34 as illustrated or secured thereto by fastening means such as rivets. A brake shoe web portion 38 extends radially inwardly from table 34. Web 38 may be integrally formed as by casting with table 34 or joined thereto as by welding. On the inboard side of web 38, a pair of tabs 40 and 42 project radially inwardly from table 34. A similar pair of tabs projects radially inwardly from table 34 on the outboard side of web 38, but only one of these tabs, identified by the reference numeral 44, is shown (FIG. 2). Each of these tabs has an aperture formed therethrough, the significance of which will be discussed below.

As is well known in the art, movement of brake actuator plunger 24 out of the actuator housing causes a radially outward movement of the brake shoes into engagement with a conventional brake drum (not shown) that surrounds the brake assembly. Brake shoe 30 has web ends 46 and 48 in intimate contact with actuator plungers extending from actuator housings 10 and 12 respectively. During the radially outwardly directed movement of brake shoe 30 during braking, and at all other times, lateral movement of the brake shoe 30 in a direction parallel to the axis of the vehicle axle is prevented. Such lateral movement is prevented by brake shoe guides 50 and 52 mounted on the outer periphery of the support plate 6. As the brake guides 50 and 52 are identical, only the former will be described herein in detail.

In order to facilitate the mounting of the guide 50 on the outer periphery of the mounting plate 6, a flat spot 54 is formed on the outer surface of rib 14. Flat spot 54 lies in the same plane as a flat spot 56 formed on the outer periphery of the rib 26. This plane is perpendicular to a radial plane extending outwardly from the center of assembly 4. Guide 50 has a base portion 58 that is flat bottomed and thus lies evenly on the flat spots 54 and 56. Base 58 has formed therethrough a pair of apertures 60 and 62 the significance of which will be explained below.

Projecting from base 58 of guide 50 in opposite directions are a pair of raised ears 64 and 66. Fasteners 68 and 70 extend through holes formed in ears 64 and 66 respectively to removably secure guide 50 to mounting plate 6. Suitable fasteners for this purpose are threaded bolts. It is important to note that ears 64 and 66 are located on the inboard extremity of guide member 50. Because of this positioning, fasteners 68 and 70 readily are accessible to a mechanic located inboard of the brake assembly 4.

Also formed on guide member 50 are a pair of spaced apart tabs 72 and 74 that project radially outwardly and define therebetween a radially extending, outwardly open channel 76. Channel 76 has a width dimensioned to allow it to receive the radially innermost extremity of brake shoe web 38 in a loose sliding fit. With web 38 so confined between tabs 72 and 74 of guide 50 as well as similar structure of guide 52, lateral movement of the brake shoe 30 positively is prevented.

A pair of tension springs 78 and 80 serve as return springs for the brake shoe 30 to return this brake shoe to a retracted position upon termination of the braking force applied by the brake actuator plungers. Tension spring 78 has one of its hook-shaped ends extending through the aperture on the tab 40. The other end of spring 78 extends into aperture 60 and thus is secured to guide base 58. In a similar manner, one end of spring 80 engages tab 44 while the other extends into guide base aperture 62 and thereby is secured to the guide 50. The return springs 78 and 80 thus provide resilient interconnection of the brake shoe 30 and the guide member 50.

When it is necessary to remove brake shoe 30 for relining or for inspection of the lining 36, it is only necessary for a mechanic, located inboard of the brake assembly 4, to manipulate the readily accessible fastening means that removably secure guide members 50 and 52 to mounting plate 6 and possibly to rotate the bolt 22 to back this bolt away from shoe 30. Upon the completion of these simple procedures, the brake shoe 30 may be moved in a lateral inboard direction for removal from the brake assembly 4. This lateral inboard movement of the brake shoes is not impeded by the guide members 50 and 52 since the guide members 50 and 52 are moved laterally with the brake shoe 30. Also, the difficult task of disengaging the brake shoe from the tension return springs 78 and 80 need not be accomplished prior to removal of the brake shoe from the assembly 4, but may be accomplished subsequent to this removal when greater access to these springs is possible and when the mechanic need not utilize large degrees of manual force or special tools in a confining location. It readily may be understood that brake shoe 32, mounted in a manner identical to brake shoe 30, may be removed from the brake assembly 4 in a like manner.

It thus may be seen that the design of the vehicle brake assembly of this invention permits easy removal of the brake shoes from inboard of the assembly without the need to remove the brake drum or other structure located outboard of the brakes. The removal of the brake shoes is unimpeded by the shoe guides since these guides easily are removed with the brake shoes. Also, brake shoe removal does not require prior disengagement of the strong brake return springs, which disengagement may be accomplished subsequent to removal of the brake shoes from the location of the brake assembly. All these advantages are obtained utilizing brake shoes of a generally conventional design that cooperate with the other assembly parts to permit ease of manufacture and fitting of the brake assembly.

We claim:

1. A vehicle brake assembly adapted to be mounted on a vehicle axle, said brake assembly including a main support member adapted to be secured to said axle about the periphery thereof and extend generally radially therefrom, brake shoe actuating means carried by said member, the improvement comprising at least one brake shoe guide element positioned on the outer periphery of said member and removably secured thereto by fastening means accessible from the inboard side of said assembly, said element being formed with a radially extending outwardly open channel, a brake shoe including brake lining and having a radially extending web portion received in said channel to prevent lateral movement of said brake shoe, and a pair of tension springs positioned on opposite sides of said web portion to interconnect said brake shoe and said element while permitting radial outward movement of said brake shoe in response to forces exerted thereon by said actuator means, whereby said springs, said brake shoe, and said element may be removed as a sub-assembly from said brake assembly upon removal of said fastening means.

2. The vehicle brake assembly of claim 1, wherein said assembly includes a plurality of brake shoes, and at least two of said elements associated with each of said shoes.

3. A vehicle brake assembly adapted to be mounted on a vehicle axle, said brake assembly including a main support member adapted to be secured to said axle about the periphery thereof and extending generally radially therefrom, a brake shoe including a brake lining on the radially outermost portion thereof, a table portion spaced radially outwardly from said member mounting said lining and a web portion extending radially inwardly from said table portion toward said member, brake shoe activating means carried by said member in proximity with said brake shoe and capable of exerting a force on said brake shoe for urging said brake shoe radially outwardly, the improvement comprising: brake shoe guide means removably secured to the outer periphery of said member by fastener means accessible from the inboard side of said assembly, said guide means including integral abutment means located on both lateral sides of said web portion and preventing lateral movement of said brake shoe while permitting radial movement thereof, and tension return spring means secured at one end thereof to said guide means, whereby removal of said brake shoe from said brake assembly may be accomplished by separation of said guide means from said member.

4. The assembly of claim 3, wherein said guide means includes a main body and said abutment means comprise a pair of projections extending radially outwardly from said main body that define therebetween an outwardly open channel in which said web portion is received.

5. A vehicle brake assembly adapted to be mounted on a vehicle axle, said brake assembly including a main support member adapted to be secured to said axle about the periphery thereof and extending generally radially therefrom, a brake shoe including a brake lining on the radially outermost portion thereof, a table portion spaced radially outwardly from said member mounting said lining and a web portion extending radially inwardly from said table portion toward said member, brake shoe activating means carried by said member in proximity with said brake shoe and capable of exerting a force on said brake shoe for urging said brake shoe radially outwardly, the improvement comprising: brake shoe guide means removably secured to the outer periphery of said member, said guide means including abutment means located on both lateral sides of said web portion and preventing lateral movement of said brake shoe while permitting radial movement thereof, and at least one pair of tension return springs positioned on opposite sides of said web portion, one end of each of said springs being secured to said guide means and the other end of each of said springs being secured to said table portion, whereby removal of said brake shoe from said brake assembly may be accomplished by separation of said guide means from said member.

* * * * *